United States Patent [19]

Prestel

[11] Patent Number: 4,538,140

[45] Date of Patent: Aug. 27, 1985

[54] FIBER OPTIC ACOUSTIC TRANSDUCER INTRUSION DETECTION SYSTEM

[75] Inventor: David J. Prestel, Chagrin Falls, Ohio

[73] Assignee: Gould Inc., Rolling Meadows, Ill.

[21] Appl. No.: 363,854

[22] Filed: Mar. 31, 1982

[51] Int. Cl.³ ............................................. G08B 13/00
[52] U.S. Cl. ..................................... 340/556; 340/566
[58] Field of Search ............................. 340/555–556, 340/557, 566; 73/655, 705; 250/227; 350/96.29

[56] References Cited

U.S. PATENT DOCUMENTS

| | | |
|---|---|---|
| 3,442,568 | 3/1969 | Siegmund et al. |
| 3,662,326 | 5/1972 | Dennis ............................. 340/566 X |
| 3,745,552 | 9/1973 | Wilt ................................... 340/566 X |
| 4,071,753 | 1/1978 | Fulenwider et al. ............ 250/227 X |
| 4,086,484 | 4/1978 | Steensma ...................... 350/96.10 X |
| 4,115,753 | 9/1978 | Shajenko . |
| 4,144,530 | 3/1979 | Redfern ............................... 340/566 |
| 4,158,310 | 6/1979 | Ho ........................................ 73/705 |
| 4,223,304 | 9/1980 | Barowitz et al. .................... 340/566 |
| 4,235,113 | 11/1980 | Carome ................................. 73/655 |
| 4,238,856 | 12/1980 | Bucaro et al. ..................... 73/655 X |
| 4,241,338 | 12/1980 | Spirig ................................... 340/566 |
| 4,297,684 | 10/1981 | Butter ............................. 340/566 X |
| 4,354,735 | 10/1982 | Stowe et al. ...................... 350/96.29 |
| 4,375,680 | 3/1983 | Cahill et al. ...................... 73/655 X |
| 4,405,198 | 9/1983 | Taylor .................................. 73/655 |

*Primary Examiner*—Jerry W. Myracle

[57] ABSTRACT

An intrusion detection system for sensing mechanical and acoustical vibrations, comprises a light source, a fiber optic acoustic transducer, a light intensity to current converter circuit, a display and an audio monitor. The light source is positioned at a point remote from an area to be protected and is coupled to the fiber optic acoustic transducer by a low loss fiber optic transmission line. Similarly, the light intensity to current converter circuit, the display and the audio monitor are located at a point remote from the area to be protected, and are coupled to the fiber optic acoustic transducer by a low loss fiber optic transmission line. When mechanical or acoustical vibrations impinge on the fiber optic acoustic transducer it modulates the intensity of the light beam generated by the light source, thereby causing the system to generate both a visual and audio indication that an intrusion is taking place. Since the system emits no radiation, (e.g. thermal, electrical, acoustical, electro-magnetic etc.) and can be embedded in walls, floors, etc. it is not readily detectable by an intruder and hence can not be disabled or avoided by the intruder.

10 Claims, 9 Drawing Figures

FIBER OPTIC ACOUSTIC TRANSDUCER INTRUSION DETECTION SYSTEM

BACKGROUND OF THE INVENTION

This invention relates to intrusion detection systems which are used to detect entry into rooms, buildings, or controlled areas, and more particularly to an intrusion detection system which includes a fiber optic acoustic transducer.

Presently, there are a number of intrusion detection systems which are employed to detect the presence of an intruder within a predetermined area to be protected. Usually the detection of an unwanted intrusion will cause activation of a visual and/or audible alarm, either locally in the protected area or at a remote monitoring station.

In general, existing intrusion detection systems depend upon the interruption of an electric current or light beam, or the disturbance of an acoustic or electromagnetic field. These systems radiate energy (current, light, acoustic or electromagnetic) which is detectable by an intruder (either visually or with some type of detection means) and which identifies the type of system and the location of the operative elements to the intruder. Upon detection, the intruder is often able to disable or avoid the detection system, thereby rendering the detection system incapable of detecting the presence or activities of the intruder.

Thus, there is a need in the art for an intrusion detection system which is totally passive and therefore incapable of detection by an intruder. There is a further need for an intrusion detection system employing a transducer which has uniform sensitivity throughout the area to be protected.

SUMMARY OF THE INVENTION

It is an object of the present invention to provide an intrusion detection system which overcomes the deficiencies of prior art intrusion detection systems.

In particular, it is an object of the present invention to provide an intrusion detection system which is capable of detecting the presence of an intruder within a protected area in an entirely passive manner, and which is not subject to detection by other than direct physical disassembly of the controlled area.

A further object of the present invention is to provide an intrusion detection system which can be built into the walls, floor, or ceiling of an area to be protected.

A further object of the present invention is to provide an intrusion detection system which has uniform sensitivity throughout the area to be protected.

A further object of the present invention is to provide an intrusion detection system having an output which can be monitored aurally by an operator, thereby enabling the operator to determine the precise nature of an intrusive event.

A further object of the present invention is to provide an intrusion detection system which may be employed both indoors and outdoors.

A still further object of the present invention is to provide an intrusion detection system which is not susceptible to any form of jamming.

The intrusion detection system of the present invention has a number of unique features and advantages as set forth below. The intrusion detection system of the present invention includes a light source and a fiber optic acoustic transducer for modulating the intensity of a light beam in response to mechanical or acoustical vibrations within an area to be protected. A light intensity to current converter converts the modulated light beam into a detection signal which is input to an acoustic/visual display to display a visible and/or audio intrusion display signal. The detection signal is also input to an acoustic monitor which generates an audio signal corresponding to the mechanical or acoustical vibrations.

The fiber optic acoustic transducer which is employed in the intrusion detection system of the present invention can be built into the walls, floors, or ceiling of an area to be protected, and hence can be made invisible to an intruder. The fiber optic acoustic transducer does not radiate any thermal, electrical, acoustical, or electromagnetic energy, thereby rendering the fiber optic acoustic transducer indetectable by an intruder. In addition, the fiber optic acoustic transducer is sensitive to sound along its entire length, thereby offering uniform sensitivity throughout the protected area. Further, the intrusion detection system is not susceptible to any form of jamming, since even if a loud noise-maker is used to cover the intrusive sounds, the presence of the noise-maker will indicate an intrusive event. The generation of the audio signal by the intrusion detection system enables an operator to aurally monitor the output of the intrusion detection system to determine the nature of the intrusion.

These together with other objects and advantages which will become subsequently apparent, reside in the details of construction and operation as more fully hereinafter described and claimed, reference being had to the accompanying drawings forming a part hereof, wherein like numerals refer to like parts throughout.

DETAILED DESCRIPTION OF THE PREFERRED EMBODIMENTS

Figure 1:
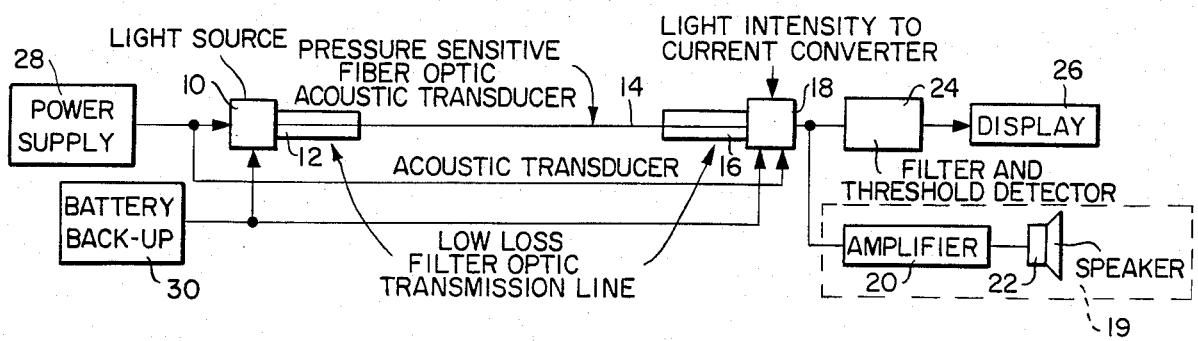
FIG. 1 is a block diagram of the intrusion detection system of the present invention.

FIG. 1 is a block diagram of the intrusion detection system of the present invention, including a regulated light source 10 for generating a light beam which is transmitted on a low loss fiber optic transmission line 12. The low loss fiber optic transmission line 12 is coupled to a pressure sensitive fiber optic acoustic transducer 14 (hereinafter referred to as fiber optic acoustic transducer 14) which modulates the intensity of the light beam transmitted through the low loss fiber optic transmission line 12, in response to mechanical or acoustical vibrations caused by sound and pressure fluctuations within the area to be protected. The fiber optic acoustic transducer 14 is a linear sensor having an output which may be processed to detect specific events and to reject false alarms. The fiber optic acoustic transducer 14 is only a few thousandths of an inch in diameter, can be built into the walls, floor, or ceiling of the protected area, and is visually undetectable by an intruder. In addition, by placing the acoustic transducer within, for example, the walls, the aesthetic objections to prior art window tapes and door switches are obviated. Further, since the fiber optic acoustic transducer does not radiate any thermal, electrical, or electromagnetic energy, it is undetectable even by an intruder employing sophisticated detection equipment. The fiber optic acoustic transducer 14 is sensitive to sound along its entire length, and thus offers uniform sensitivity throughout the protected area, unlike a discrete microphone.

In the preferred embodiment, the fiber optic acoustic transducer 14 is of the type disclosed in U.S. patent application Ser. No. 106,761 filed Dec. 26, 1979 by David W. Stowe et al, now U.S. Pat. No. 4,354,735, and assigned to the assignee of the present application, now U.S. Pat. No. 4,354,735 the disclosure of which is hereby incorporated by reference. Alternatively, the fiber optic acoustic transducer 14 could be of the type disclosed in PCT Publication No. WO 79/00377 to Macedo et al, published June 28, 1979.

Returning to FIG. 1, a low loss fiber optic transmission line 16, through which the modulated light beam travels, is coupled to the fiber optic acoustic transducer 14. A light intensity to current converter circuit 18 which is connected to the low loss fiber optic transmission line 16, converts the light intensity into an electric current and is a means for converting the modulated light beam to a detection signal. An audio monitor 19, comprising an amplifier 20 and a speaker 22, is connected to the light intensity to current converter circuit 18 and is used as a means for converting the detection signal into an audio signal. The audio amplifier 20 and speaker 22 may be of any type suitable for generating audio signals and, for example, may be of the intercom or hi-fi system type. The amplifier 20 and speaker 22 enable aural monitoring of an intrusion by an operator and thus provide more information than the mere fact that an intrusion has occurred. The operator is able to listen to the speaker 22 to determine the type of intrusive activity (e.g. breaking of a window, number of intruders, weapons being used, etc.) which is occurring. Thus, the speaker 22 provides a type of audible information which is similar to that provided by a discrete microphone and speaker arrangement. However, because of the uniform sensitivity of the fiber optic acoustic transducer 14, the intrusion detection system of the present invention is capable of monitoring sounds throughout the protected area.

A filter and threshold detector circuit 24 is connected to the light intensity to current converter circuit 18 to compensate for the varying ambient background noises, so that only those events which deviate from the background by a predetermined amount are detected as an intrusion, thereby causing the filter and threshold detector circuit 24 to generate an intrusion signal. The output of the filter and threshold detector circuit 24 is fed to an acoustic/visual display 26 (hereinafter referred to as display 26) which displays a visible and/or audio (i.e. alarm) intrusion display signal. Thus, the filter and threshold detector circuit 24 and the display 26 form a means for displaying an indication that an intrusion has taken place. The particular filter and threshold detector circuit 24 is selected according to the specific application of the intrusion detection system, so that the filter must be chosen to reject undesired sound frequencies which represent false alarms. The threshold detector requires a minimum sound level and, alternatively, a minimum duration of occurrence or a minimum number of occurrences to activate the display 26. A power supply 28 provides power to the light source 10 and the light intensity to current converter circuit 18, while a battery backup 30 insures a constant source of power to the light source 10 (thereby insuring constant light intensity) and to the light intensity to current converter circuit 18. The provision of the battery backup 30 makes the intrusion detection system of the present invention independent of any failures in commercial power sources. In the preferred embodiment, all of the elements of FIG. 1 except the fiber optic acoustic transducer 14 are located at a remote monitoring station. The low loss fiber optic transmission lines 12 and 16 connect the fiber optic acoustic transducer 14 to the monitoring station.

Figure 2:
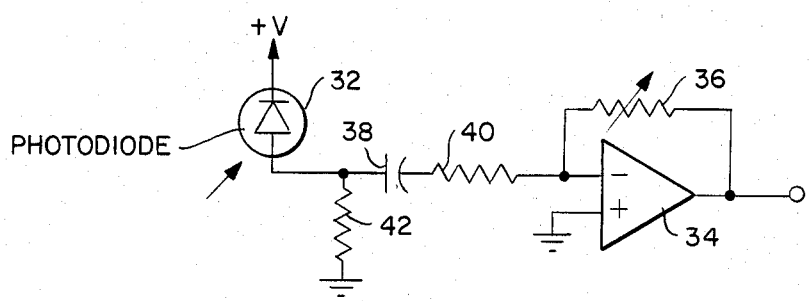
FIG. 2 is a circuit diagram of the light intensity to current converter circuit 18 of FIG. 1.

FIG. 2 is a circuit diagram of the preferred embodiment of the light intensity to current converter circuit 18 of FIG. 1. The light intensity to current converter circuit 18 includes a photodiode 32, an amplifier 34, a variable resistor 36, a capacitor 38, and two resistors 40 and 42. In the preferred embodiment, the photodiode 32 comprises a PIN silicon photodiode such as the Hamamatsu S 1188 photodiode or the RCA C30808 photodiode. The bias voltage $+V$ and the resistance of the resistor 42 are selected based upon the particular photodiode 32 employed, while the gain of the circuit (determined by the variable resistor 36) is selected in dependence upon the lowest sound level to be detected. The variable resistor 36 may be replaced by a frequency selective circuit if it is desired to reject certain frequencies or to enhance others. In the preferred embodiment, the amplifier 34 is a 741 operational amplifier.

Figure 3:
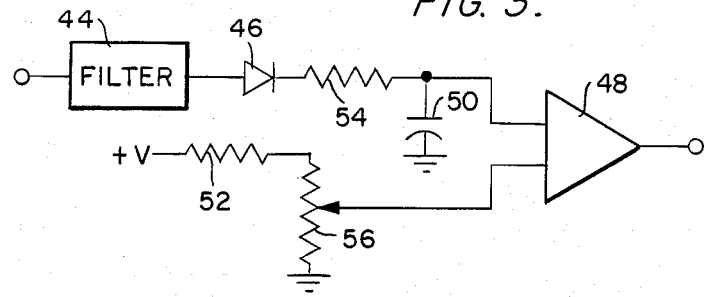
FIG. 3 is a circuit diagram of a first embodiment of the filter and threshold detector circuit 24 of FIG. 1.

As noted above, the filter and threshold detector circuit 24 is selected in accordance with the specific application (i.e. environment and type of intrusion to be detected) of the intrusion detection system. FIG. 3 is a circuit diagram of a first embodiment of a filter and threshold detector circuit 24 including a filter 44 which is implemented as an active or passive low pass, high pass, or bandpass filter; an active or passive notch filter; or a digital filter. The choice of the particular filter 44 depends upon the particular sounds which are to be detected and the particular sounds which are to be rejected. For example, it may be desirable to detect speech and machinery noises, while rejecting traffic sounds and air conditioner sounds. The filter and threshold detector circuit 24 which is illustrated in FIG. 3 further includes a diode 46, a comparator 48, a capacitor 50, resistors 52 and 54, and a variable resistor 56. The resistor 54 and the capacitor 50 form an averager which requires a minimum duration for the filtered detection signal output by the filter 44 before detection of an intrusion is possible. The variable resistor 56 is adjusted to determine the threshold level for detecting the intrusive event. In operation, the comparator 48 compares the filtered detection signal with the threshold level and outputs an intrusion signal which is input to the display 26 when the filtered detection signal exceeds the threshold level.

Figure 4:
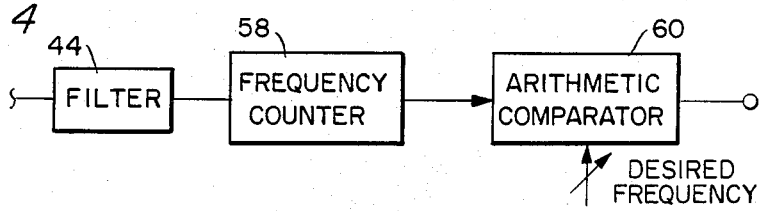
FIG. 4 is a block diagram of a second embodiment of the filter and threshold detector circuit 24 of FIG. 1.

FIG. 4 is a block diagram of a second embodiment of the filter and threshold detector circuit 24, including a frequency counter circuit 58 and an arithmetic comparator 60. In this embodiment, the frequency counter circuit 58 measures the frequency of the filtered detection signal and outputs an actual frequency signal, representing the measured frequency, to the arithmetic comparator 60. The arithmetic comparator 60 compares the measured frequency to the desired frequency and generates an intrusion signal, which is input to the display 26, when a sound of the desired frequency is detected.

Figure 5:
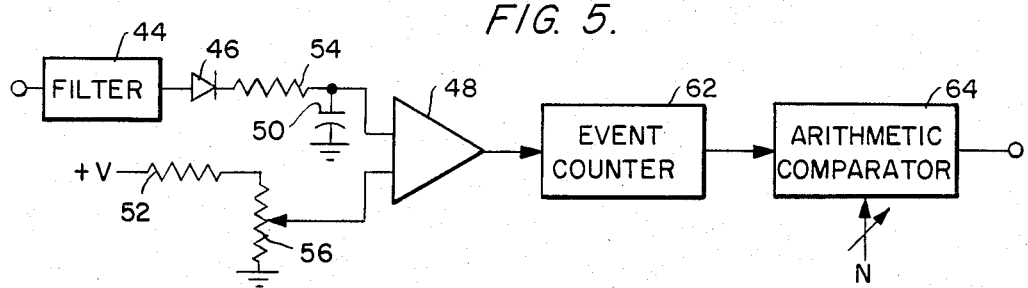
FIG. 5 is a block diagram of a third embodiment of the filter and threshold detector circuit 24 of FIG. 1.

FIG. 5 is a block diagram of a third embodiment of the filter and threshold detector circuit 24, and is a combination of the embodiment of FIG. 3, an event counter circuit 62 and an arithmetic comparator 64. As in FIG. 3, the comparator 48 outputs a threshold signal when the filtered detection signal exceeds the threshold level. The event counter 62 counts the number of times that the comparator 48 outputs the threshold signal and provides its count to the arithmetic comparator 64. The arithmetic comparator 64 compares the count output by the event counter 62 with a predetermined number (N, where N is an integer) and outputs an intrusion signal to the display 26 after the Nth time that the comparator 48 detects that the threshold has been exceeded.

Figure 6:
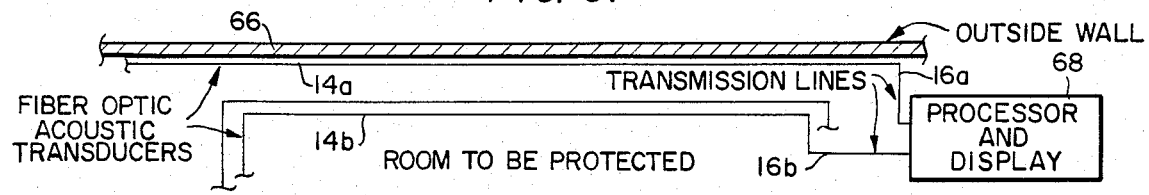
FIG. 6 is a schematic diagram illustrating the positioning of two fiber optic acoustic transducers 14a and 14b in an embodiment of the present invention for rejecting sounds coming from outside the area to be protected.

FIG. 6 is a schematic diagram illustrating an embodiment of the present invention which may be employed to reject sounds emanating from an undesired direction outside the area to be protected. In this embodiment, a first fiber optic acoustic transducer 14a is positioned adjacent an outside wall 66, while a second fiber optic acoustic transducer 14b is positioned in a room to be protected. The fiber optic acoustic transducers 14a and 14b are connected to a processor and display 68 by transmission lines 16a and 16b. In this embodiment, the processor and display 68 performs the functions of the light intensity to current converter circuit 18, the amplifier 20, the speaker 22, the filter and threshold detector circuit 24 and the display 26. In addition, the processor and display 68 rejects sounds coming from undesired directions. For example, if sounds are generated outside the room to be protected (e.g. by traffic, airplanes, etc.), these sounds are rejected because they come from an undesired direction. These undesired vibrations are rejected on the basis that they arrive at the fiber optic acoustic transducer 14a prior to impinging upon the fiber optic acoustic transducer 14b, or on the basis that the vibrations which contact the fiber optic acoustic transducer 14a, during a predetermined time frame, are of a higher amplitude than the sounds which contact the fiber optic acoustic transducer 14b. In either case, the processor and display 68 will not generate an intrusion display signal when a sound from an undesired direction is detected.

Figure 7:
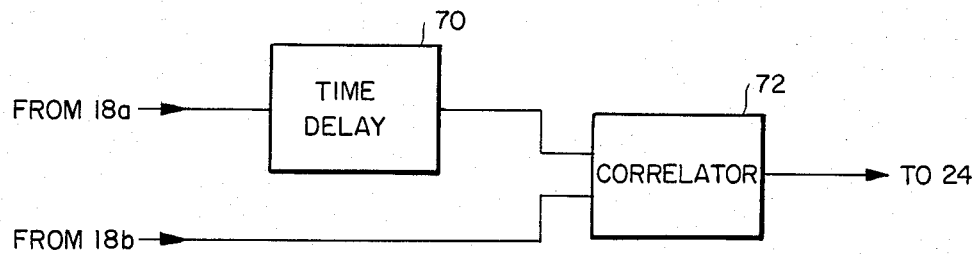
FIG. 7 is a block diagram of a first embodiment of a part of the processor and display 68 of FIG. 6.
Figure 8:
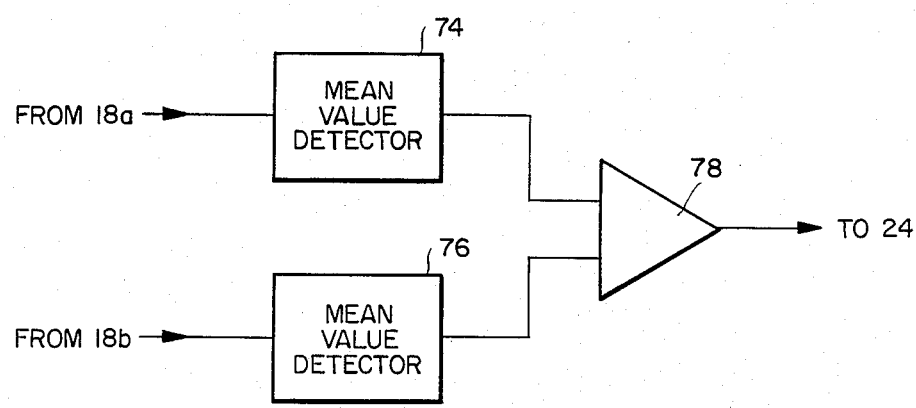
FIG. 8 is a block diagram of a second embodiment of a part of the processor and display 68 of FIG. 6.
Figure 9:
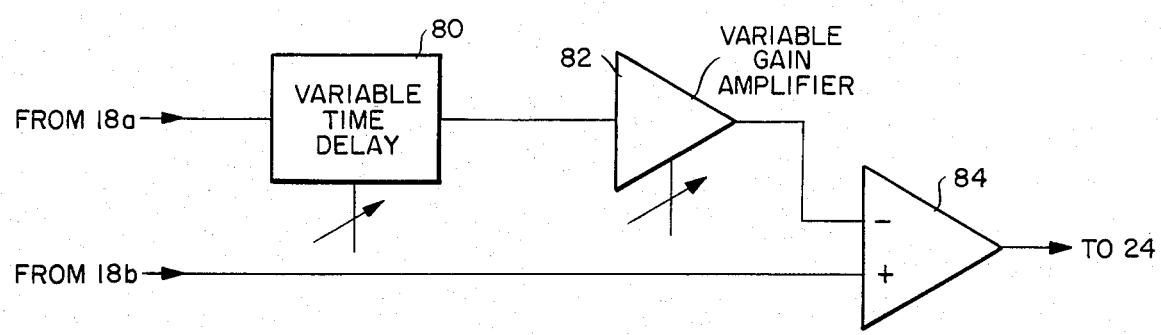
FIG. 9 is a block diagram of a third embodiment of a part of the processor and display 68 of FIG. 6.

The processor and display 68 can be implemented by a pair of light intensity to current converter circuits 18 (hereinafter referred to as circuits 18a and 18b), a pair of filter and threshold detector circuits 24, and a comparator connected to the pair of filter and threshold detector circuits 24 and to the display 26. The comparator compares the amplitude of the outputs from the pair of filter and threshold detector circuits 24 and generates an output signal only if the amplitude from the filter and threshold circuit 24, which is coupled to the fiber optic acoustic transducer 14b, is greater than the amplitude of the output of the filter and threshold detector circuit 24 which is coupled to the fiber optic acoustic transducer 14a. FIGS. 7, 8 and 9 illustrate block diagrams of alternate embodiments which may be connected between the pair of light intensity to current converter circuits 18a and 18b, and the filter and threshold detector circuit 24.

Referring to FIG. 7, a time delay circuit 70 is connected to the light intensity to current converter circuit 18a for the fiber optic acoustic transducer 14a. A correlator circuit 72 has inputs connected to the output of the time delay circuit 70 and to the light intensity to current converter circuit 18b for the fiber optic acoustic transducer 14b. The time delay circuit 70 compensates for the additional propagation time required for sounds generated outside the area to be protected to reach the fiber optic acoustic transducer 14b. The correlator circuit 72 provides an output to the filter and threshold detector circuit 24; a high correlator output indicating a high degree of correlation between the vibrations detected by the fiber optic acoustic transducers 14a and 14b, thereby indicating that the detected vibration arrived from outside the area to be protected.

Referring to FIG. 8, mean value detector circuits 74 and 76 are connected to light intensity to current converter circuits 18a and 18b, as well as to a comparator 78 which is connected to the filter and threshold detector circuit 24. Since there is considerable acoustic attenuation in building walls, the sounds arriving at the fiber optic acoustic transducer 14b from the outside will be of a lower amplitude than at the tranducer 14a, while the sounds arriving at the fiber optic acoustic transducer 14a from the inside will be of a lower amplitude than at the transducer 14b. The mean value detector circuits 74 and 76 serve as averagers to increase the accuracy of the output of the comparator 78. The comparator 78 can be connected as either a false alarm (outside louder than inside) or a true alarm (inside louder than outside) indicator.

Referring to FIG. 9, a variable time delay circuit 80 is connected to the light intensity to current converter circuit 18a and to a variable gain amplifier 82. A summing amplifier 84 has inputs connected to the light intensity to current converter circuit 18b and to the output of the variable gain amplifier 82. This circuit is essentially an adaptive cancellor which is especially useful in the presence of a continuous external noise source, for example, nearby machinery, air conditioning, etc. The variable time delay circuit 80 and the variable gain amplifier 82 are adjusted to compensate for the propagation delays and path attenuation described above with respect to FIGS. 7 and 8. Vibrations detected by the outside fiber optic acoustic transducer 14a are compensated and subtracted from the signal generated by the fiber optic acoustic transducer 14b, thereby leaving only a signal representing the inside sound, which may be processed by any of the circuits illustrated in FIGS. 3, 4 and 5.

Another alternative embodiment of the processor and display 68 can be implemented by a microprocessor having a simple program for rejecting sounds emanating from an undesired direction. By time sampling the signals generated by the light intensity to current converter circuits 18a and 18b and digitizing the detection signals, the embodiments illustrated in FIGS. 7, 8 and 9 can be implemented by a microprocessor. This facilitates changing system parameters such as gain, time delay or mean value and also permits the accumulation of event histories which can be analyzed for frequency of occurrence or event to event similarities. It should be noted that the fact that the fiber optic acoustic transducers 14a and 14b gather acoustic information and reproduce it as it occurred (i.e. linearly) makes the microprocessor implementation of the two-sensor system of FIG. 6 feasible.

The intrusion detection system of the present invention may be implemented in numerous ways. For example, the fiber optic acoustic transducer 14 may be embedded in walls to detect the sounds and/or vibrations arising from the opening of doors or windows or the forceable penetration of the walls, windows, or ceiling. The fiber optic acoustic transducer 14 may also be embedded in floors, doorways, or window sills to detect pressures arising from people walking, objects being moved, or windows being opened (i.e. lifted off the sill). The fiber optic acoustic transducer 14 may be used as a microphone to monitor activity within an area and to allow the operator to assess the nature of the activity as part of counter-intrusion tactics. Since the fiber optic acoustic transducer 14 is only a few thousandths of an inch in diameter, it may be easily incorporated into almost any style of building construction. In addition, it may be used outside for vehicle detection, and if laid down in a grid, can secure an open area against intrusion. Since the intrusion detection system has no moving or mechanical parts to fail or deteriorate (such as door switches or TV camera scanners) it is inherently reliable and insensitive to the environment. In addition, the fiber optic acoustic transducer 14 is not susceptible to jamming, since even if a loud noise-maker is used to cover the sound of the intrusion, the presence of the noise maker indicates to the operator that something is amiss.

The many features and advantages of the invention are apparent from the detailed specification, and thus it is intended by the appended claims to cover all such features and advantages of the system which fall within the true spirit and scope of the invention. Further, since numerous modifications and changes will readily occur to those skilled in the art, it is not desired to limit the invention to the exact construction and operation shown and described and, accordingly, all suitable modifications and equivalents may be resorted to, falling within the scope of the invention.

What is claimed is:

1. An intrusion detection system for sensing mechanical and acoustical vibrations in a room having walls, comprising:
    a light source for generating a light beam at a point remote from the room;
    first means, operatively connected to said light source, for transmitting the light beam to the room;
    second means, coupled to said first means and positioned inside the walls of the room, for modulating the intensity of the light beam in response to mechanical or acoustical vibrations;
    third means, coupled to said second means, for conducting the modulated light beam to a position remote from the room;
    fourth means, operatively connected to said third means, for converting the modulated light beam to a detection signal;
    fifth means, operatively connected to said fourth means, for generating an intrusion display signal in dependence upon the detection signal; and
    sixth means, operatively connected to said fourth means, for generating an audio signal in dependence upon the detection signal, the audio signal being a substantial reproduction of the mechanical or acoustical vibrations at all audio frequencies of the mechanical or acoustical vibrations which cause said second means to modulate the intensity of the light beam.

2. An intrusion detection system as set forth in claim 1, wherein said sixth means comprises:
    an amplifier, operatively connected to said fourth means, for receiving and amplifying the detection signal; and
    a speaker, operatively connected to said amplifier, for outputting the audio signal.

3. An intrusion detection system as set forth in claim 2, wherein said second means comprises a fiber optic acoustic transducer.

4. An intrusion detection system as set forth in claim 3, wherein said fourth means comprises a light intensity to current converter circuit.

5. An intrusion detection system as set forth in claim 4, wherein said fifth means comprises:
    a filter and threshold detector circuit, operatively connected to said light intensity to current converter circuit, for receiving the detection signal and for generating an intrusion signal; and
    a display, operatively connected to said filter and threshold detector circuit, for generating the intrusion display signal in dependence upon the intrusion signal.

6. An intrusion detection system for sensing mechanical and acoustical vibrations in a room having walls, comprising:
    a light source for generating first and second light beams at a point remote from the room;
    first means, operatively connected to said light source and positioned in the walls, for modulating the intensity of the first light beam in response to mechanical or acoustical vibrations;
    second means, operatively connected to said light source and positioned outside the room, for modulating the intensity of the second light beam in response to mechanical or acoustical vibrations;
    third means, coupled to said first and second means, for converting the first and second modulated light beams into first and second detection signals, respectively; and
    fourth means, operatively connected to said third means, for comparing the timing of the first and second detection signals to determine whether the mechanical or acoustical vibrations corresponding to the first detection signal, originated inside or outside the room, and for generating an intrusion signal only in response to mechanical or acoustical vibrations generated within the room.

7. An intrusion detection system as set forth in claim 6, further comprising:
    fifth means, operatively connected to said third means, for generating an audio signal in dependence upon the first detection signal, the audio signal being a substantial reproduction of the mechanical or acoustical vibrations at all audio frequencies of the mechanical or acoustical vibrations which cause said first means to modulate the intensity of the first light beam.

8. An intrusion detection system as set forth in claim 7, wherein said first and second means each comprise a fiber optic acoustic transducer.

9. An intrusion detection system as set forth in claim 8, wherein said third, fourth and fifth means are located at a point remote from the room, said system further comprising:
- a first fiber optic transmission line coupled between said light source and said first means;
- a second fiber optic transmission line coupled between said light source and said second means;
- a third fiber optic transmission line coupled between said first means and said third means; and
- a fourth fiber optic transmission line coupled between said second means and said third means.

10. An intrusion detection system for sensing mechanical and acoustical vibrations generated within an area to be protected, comprising:
- a light source for generating first and second light beams at a point remote from the area to be protected;
- first means, operatively connected to said light source and positioned within the area to be protected, for modulating the intensity of the first light beam in response to mechanical or acoustical vibrations;
- second means, operatively connected to said light source and positioned adjacent the perimeter of the area to be protected, for modulating the intensity of the second light beam in response to mechanical or acoustical vibrations;
- third means, coupled to said first and second means, for converting the first and second modulated light beams into first and second detection signals, respectively; and
- fourth means, operatively connected to said third means, for comparing the timing of the first and second detection signals to determine whether the mechanical or acoustical vibrations corresponding to the first detection signal, originated inside or outside the area to be protected, and for generating an intrusion display signal only in response to mechanical or acoustical vibrations generated within the area to be protected.

* * * * *